United States Patent [19]

Bayne

[11] Patent Number: 5,123,378
[45] Date of Patent: Jun. 23, 1992

[54] GROOMING AND OR FORAGING APPARATUS FOR REDUCTION OF STRESS IN CAGED ANIMALS

[75] Inventor: Kathryn A. L. Bayne, Germantown, Md.

[73] Assignee: The United Stats of America as represented by the Secretary of Health and Human Services, Washington, D.C.

[21] Appl. No.: 398,564

[22] Filed: Aug. 25, 1989

[51] Int. Cl.⁵ .............................................. A01K 29/00
[52] U.S. Cl. ........................................ 119/29; 119/15; 119/18
[58] Field of Search .................... 119/18, 15, 17, 29, 119/83, 85, 51.01, 1; 446/387, 369

[56] References Cited

U.S. PATENT DOCUMENTS

| | | | |
|---|---|---|---|
| 2,633,100 | 3/1953 | Auerbach | 119/18 |
| 2,894,487 | 7/1959 | Goldson | 119/29 |
| 3,122,199 | 2/1964 | Wise | 119/18 |
| 3,479,991 | 11/1969 | Lichtenberger | 119/29 |
| 3,482,548 | 12/1969 | Burns | 119/29 |
| 3,731,657 | 5/1973 | Alessio | 119/17 |
| 3,964,438 | 6/1976 | Rodemeyer | 119/15 |
| 4,539,936 | 9/1985 | Majewski | 119/29 |
| 4,727,825 | 3/1988 | Houghton | 119/29 |

*Primary Examiner*—John G. Weiss
*Attorney, Agent, or Firm*—Robert Benson

[57] ABSTRACT

Grooming and/or foraging opportunities are provided for caged animals, specifically to nonhuman primates, in order to enrich the environment thereof thus to reduce boredom and stress of the animals. By increasing normative behavior, the inventive method and apparatus reduce abnormal behavior and broaden the behavioral repertoire of the animal. The inventive structure includes a hard backing board of Plexiglass, Lexan, metal or other similar materials, covered with a natural or artificial cloth, fur, fleece, carpeting or the like. Food particles of different sizes with rough edges may be rubbed into the cloth material to elicit foraging activities from the animal.

8 Claims, 1 Drawing Sheet

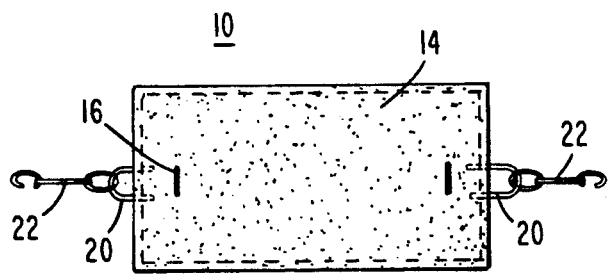
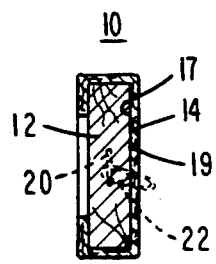
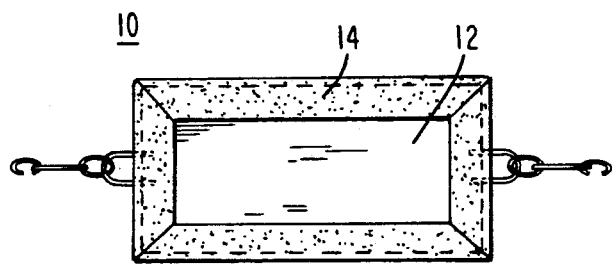
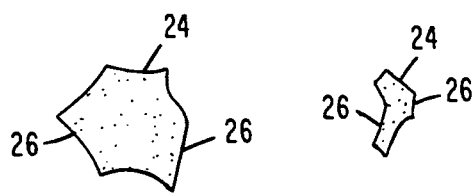
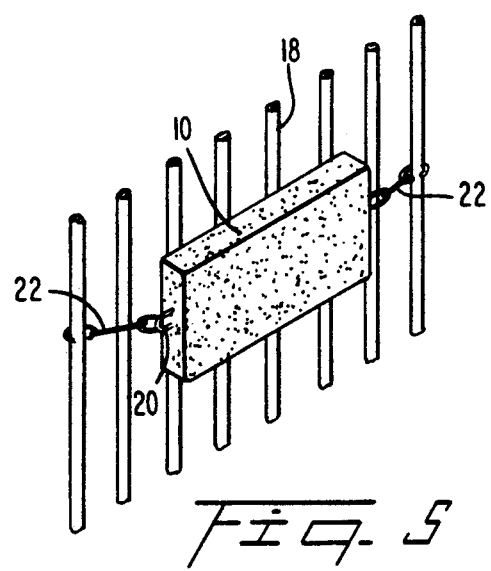

GROOMING AND OR FORAGING APPARATUS FOR REDUCTION OF STRESS IN CAGED ANIMALS

TECHNICAL FIELD

This invention relates to method and apparatus for reduction of stress in caged, nonhuman primates and, more particularly, to methods and apparatus for eliciting normative behavioral activities, such as grooming and foraging, in nonhuman primates in order to reduce stress levels thereon, to improve the "psychological well-being" thereof, and thus to improve the reliability of results of various studies in which the animals participate, as well as to conform to legal mandates for reduction of such stress.

BACKGROUND ART

When nonhuman primates are confined to cages, boredom, stress and other negative psychological reactions can result. Such consequences of confinement tend to produce slanted experimental results, both in endocrine tests and, more clearly, in behavioral tests. Such results are noticeable with rhesus monkeys, for example, which tend to be social animals but which, moreover, exhibit aggressive tendencies. In many cases, caged confinement tends to exacerbate the manifestation of abnormal psychological reactions.

Several investigators have attempted to determine various alterations which may be made in a single cage environment of singly-housed laboratory primates in order to enhance the "psychological well-being" of these animals, where "psychological well-being" is defined predominantly by an absence of behavioral pathology of the nonhuman primates in a laboratory environment.

Such prior art attempts to enhance the "psychological well-being" of the animals include provision of control for the animals over the physical environment thereof, disclosed by Spinnelli and Markowitz in 1985; exercise cages, described by Tolan et al. in 1980; provision of nylon balls, described by Renquist and Judge in 1985.

However, none of the above attempts provides environmental alterations which are easily implemented and which induce the animal to perform natural behaviors, i.e., behavior patterns occurring in noncaged animals, which require low maintenance, are cost effective and which can be provided for a large number of animals. Nor do the suggested alterations provide freedom from interference with accessability of the animals for participation in research, without harming the animal or placing the caretaking staff at risk.

Also known in the prior art are devices for relieving physical distress of animals, such as a cat scratching device disclosed in U.S. Pat. No. 3,482,548, which may be made available to felines to replace a cat scratching post or structure, without undue bulkiness in the result. However, such scratching posts provide relief for physical discomfort. That is, the feline animal requires a scratching post (or the like) for physical relief. The art does not disclose method or apparatus for relieving psychological stress.

DISCLOSURE OF THE INVENTION

It is accordingly an object of the present invention to overcome the difficulties of the prior art and to provide method and apparatus for alleviating psychological stress in a caged animal.

A more particular object of the invention is to provide method and apparatus for relieving psychological stress in nonhuman primates, i.e., animals having an opposable thumb.

It is another object of the invention to provide method and apparatus for relieving psychological discomfort in a caged primate in order to enhance reliability and performance of the primate in a number of tests.

Still another object of the invention is to provide method and apparatus for eliciting from a caged isolated animal a social response which would otherwise be available only in the presence of other animals.

It is yet another object of the invention to reduce psychological stress on a caged, nonhuman, primate by providing a structure which permits the caged primate to exercise its grooming instinct.

It is still a further object of the invention to provide for a caged, nonhuman, primate method and apparatus which encourage exercise of an equivalent of a foraging operation.

Yet another object of the invention is to provide for a caged, nonhuman, primate an apparatus for stimulating a grooming response and for stimulating a foraging response, thereby to reduce the amount of psychological stress experienced by the animal.

In accordance with these and other objects, features and advantages of the present invention, there is provided a method for reduction of stress in caged animals in which a foraging apparatus is provided in a cage and in which access to the foraging apparatus is provided to an animal in the cage. A stiff material is provided to form a base of the apparatus and a fibrous material is attached to the base for retaining food particles, thus to provide foraging foods for the animal so that normative behavioral activities of the animal, including foraging, are increased. The food particles may be placed among fibres of the fibrous material in order to engage to the fibres, thus encouraging foraging activities. Moreover, the method includes obtaining of food particles of varying sizes, thus to simulate different types of foraging activities by the animal. Preferably, the food particles have non-spherical, rough, edges for clinging to the fibres.

In accordance with yet another object of the invention, there is provided a method for stress reduction of caged animals which includes the steps of providing a grooming apparatus in a cage and providing access to the grooming apparatus for a caged animal. The grooming apparatus, similarly to the foraging apparatus, includes a base formed of a stiff material and a layer of fibrous material simulating hair and/or fur of the animal, in order to provide to the animal an object for grooming.

In accordance with still another object of the invention there is provided a grooming and foraging apparatus for a caged animal which includes a stiff base and a fibrous overlayer for retaining food particles and for simulating hair and/or fur in order to provide to the animal both an object for grooming and for foraging foods, thus increasing normative behavioral activities of the animal.

In accordance with still another aspect of the invention there is provided an apparatus for reducing stress in a caged animal, including a grooming apparatus having a stiff material forming a base thereof and a layer of fibrous material attached thereto. Alternatively, the apparatus for reducing stress is a foraging apparatus which includes the above-noted structure. The foraging apparatus, including the soft material therein, may include a fibrous material forming the soft material, further including non-spherical food particles with rough edges for clinging to the fibres of the fibrous material. Such an apparatus is preferably mounted on an upstanding wall of the cage.

In accordance with yet another object of the invention, the soft material may include a plastic material with a plurality of blade structures simulating grass blades. In such a structure, the food particles are dispersed within the simulated grass blades and the foraging apparatus is mounted on a bottom portion of the cage, thus simulating placement of food particles in a natural habitat of the animal.

Other objects, features and advantages of the present invention will become readily apparent to those skilled in the art from the following description wherein there is shown and described a preferred embodiment of the invention, simply by way of illustration and not of limitation of the best mode (and alternative embodiments) for carrying out the invention. The invention itself is set forth in the claims appended hereto. As will be realized upon examination of the specification with due reference to the drawings, the present invention is capable of still other, different, embodiments and its several details are capable of modifications in various obvious aspects, all without departing from the invention which is recited in the claims. Accordingly, the drawings and the descriptions provided herein are to be regarded as illustrative in nature and not as restrictive of the invention.

BRIEF DESCRIPTION OF DRAWINGS

The accompanying drawings, incorporated into and forming a part of the specification, illustrate several aspects of the present invention and, together with the description, serve to explain the principles of the invention wherein:

FIG. 1 shows a front view of an apparatus according to the invention usable in the inventive method;

FIG. 2 shows a back view thereof;

FIG. 3 shows a side view thereof, as seen from the left side of FIG. 1;

FIG. 4 illustrates food particles of varying sizes having jagged edges for use with the invention; and FIG. 5 shows an application of the invention wherein the inventive apparatus is attached to a vertical portion of a cage.

BEST MODE FOR CARRYING OUT THE INVENTION

In accordance with the foregoing, the present invention provides an apparatus for inducing normative behavioral patterns in a caged, nonhuman, primate animal.

As above-noted, the invention is primarily proposed for single cage animals, that is, for single animals which are housed alone though is may be equally useful for socially housed animals. More particularly, the invention is provided for use by rhesus monkeys.

Since foraging activities require an opposable thumb, the present invention is preferably used by nonhuman primates. Moreover, since incompatible rhesus monkeys are aggressive, maintaining a number of monkeys in a single cage frequently results in aggressive behavior which may skew the results of an experiment being conducted on the animals. Thus, the animals are typically housed individually. Further, since rhesus monkeys tend to groom both themselves and other animals in their vicinity, it is desirable to replace a social grooming activity, wherein an individual monkey may groom the hair of a separate monkey, by a non-social grooming activity which may be carried out in isolation.

Thus, where a monkey is separately housed, provision of a grooming apparatus in accordance with the present invention permits the animal to act in a grooming manner without the risk and difficulties associated with aggressive behavior arising towards other animals included in the same cage. As is appreciated, typical grooming activities occur when the monkeys sit closely adjacent to one another. The activities include picking of bugs, burrs and dander by one animal from the other animals, as well as from the animal itself. Thus, the invention provides the soft fibrous and flexible layer simulating the hair or fur of the various animals to permit a caged animal, in a single cage, to perform the picking and grooming activities. However, advantageously, the social grooming activity is provided for individual isolated animals, thus avoiding aggressive contact between animals and further avoiding possible cross-infection of animals, one by the other.

Referring now to the drawing figures, there is shown in FIG. 1 an apparatus for carrying out the invention, generally identified by reference numeral 10. FIG. 2 shows a back view of the apparatus, illustrating therein a base 12 of the apparatus, formed of a stiff, or hard, material, to form the body of the apparatus. Base 12 may be formed of a wooden board, of a metal sheet, of Plexiglass, of Lexan, or of other similar materials to provide some rigidity to the inventive structure. In accordance with the invention, there is provided a soft layer 14, of fibrous material, affixed to the base 12. Layer 14 may be of cloth, carpeting or the like. The material may be natural or artificial, may be cloth, fur, fleece, carpeting, or other similar material, and may, indeed, be of any material having a nap or fibres for holding food particles. The cloth layer 14, identified herein as a substrate, may be secured to the board by a variety of means, such as hardware fasteners, shown at 16 in FIG. 1. Alternatively, other fastening means, such as hook and loop materials (Velcro) or bonding materials, may be used.

As seen in FIGS. 1 and 3, the soft layer 14 preferably extends over or covers a back portion 17 of the base 12. Such an arrangement precludes separation of soft layer 14 from base 12 by a monkey inserting a finger in a vertical separating interface crack 19 between base 12 and soft layer 14 along an upper horizontal surface of the device 10.

As will be appreciated from FIGS. 1-3 and 5, the inventive apparatus, including base 12 and soft layer 14, may be attached to a vertical portion 18 of a cage by various hardware devices. For example, in the illustrated connection there is provided a pair of U-bolts 20 drilled through the Plexiglass base 12 and a pair of snap hooks 22 for mounting the apparatus onto the cage wall 18. Although only one pair of connecting devices is shown in FIG. 5, other devices may be used in various configurations in order to assure secured mounting of the inventive apparatus onto the cage wall.

Accordingly, a singly caged animal may groom the soft layer 14 in a normal manner, notwithstanding isolated confinement, thus reducing boredom and stress and enriching the environment in which the animal is confined.

In addition to functioning to induce a grooming activity by the caged primate, food particles such as shown at FIG. 4 may be distributed along the soft layer 14 of the inventive apparatus.

The food particles, as seen in FIG. 4, are of varying sizes to require varying degrees of effort on the part of the primate to extract the same from the fibres of the soft layer 14. The particles, shown in FIG. 4 and identified by reference numeral 24, are preferably non-spherical to provide jagged edges 26 for clinging to the fleece fibres. Typical sizes of the food particles may be in the range of 2 millimeters to 4 millimeters.

In addition to the different sizes of the particles, the food particles may be of different flavors, to provide yet another point of interest for the caged animal. The various food particles are provided as a supplement to the animal's typical diet.

The food particles may be applied to the soft layer 14 of the invention by scattering a handful of particles 24 along the surface thereof and by rubbing the particles into the fibres thereof. Such an activity may easily be implemented manually and, if large numbers of animals are involved, mechanical devices may be used therefor.

Accordingly, the inventive structure provides a foraging apparatus to permit the animal to pick out bits of food from the soft layer, thus simulating natural foraging activities in which bits of food may be picked from grass, fruits may be picked from trees, and bugs may be picked from various environments. It should be noted that a foraging apparatus according to the invention may include a soft layer of plastic material simulating blades of grass, such as is commercially available under the designation Astroturf. Where such a material is used, the apparatus 10 is preferably placed along the floor of the cage in order better to simulate the grass environment of the animal's natural habitat and to permit the animal to carry out more realistic foraging activities.

Accordingly, the present invention provides method and apparatus for eliciting grooming and/or foraging activities from caged animals, and specifically from nonhuman primates, in order to reduce boredom and stress and to enrich the environment thereof. Advantageously, such activities increase the normative behavior of the animals and reduce abnormal behavior thereof, to broaden the behavioral repertoire of the animal. Experimental results have indicated a statistical reduction in abnormal behavior, with some animals spending as much as 50% of the observation session in foraging activities. The experiments were conducted with a structure having approximately 30.5 square centimeters of a Plexiglass board, which was mounted on the wire grid wall of a home cage and was covered with a washable and removable fleece-like cloth.

Thus, manipulative behaviors are encouraged which are similar to those used in natural situations. By removing a rhesus monkey, for example, from a social situation, the monkey is encouraged to perform grooming activities away from an environment in which, otherwise, animals sometimes groom themselves bald.

Although the disclosed structure provides a solid backing, preferably Plexiglass, and a material or carpet surface layer which may be artificial cloth, wool, fur, fleece, or the like, it should be recognized that other materials may be used. Indeed, it may be possible to utilize a single layer having sufficiently rigid characteristics but yet including a nap or fibrous texture, to replace the two-layered structure of the invention. At the present time, however, the inventive structure includes a solid backing board with the material layer which, when combined with particulate food matter, is used to induce additional normal behaviors such as foraging.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

I claim:

1. A method for the reduction of stress in caged primates, comprising the steps of:
   (a) providing an inanimate foraging apparatus comprising a stiff material to form a base of said apparatus and of attaching a layer of fibrous material to said base capable of retaining food particles therein and
   (b) providing access to said foraging apparatus to a primate in said cage, thereby to provide foraging foods for the primate whereby normative behavioral activities of the primate, including foraging, are increased.

2. The method of claim 1 comprising the further step of loading said foraging apparatus by placing food particles among fibres of said fibrous material for adhering to said fibres.

3. The method of claim 2 wherein said loading step comprises the further step of obtaining non-spherical food particles of varying sizes, said food particles having rough edges for clinging to said fibres.

4. In a cage for an animal, said cage having at least one upstanding wall, apparatus for reducing stress in a caged animal and for improving the psychological well-being thereof by encouraging normative behavioral activities comprising:
   a foraging apparatus, said foraging apparatus including
   a stiff material to form a base of said apparatus, and
   a layer of soft material attached to said base capable of retaining food particles therein wherein aid soft material comprises a fibrous material having a plurality of fibres, and further comprising non-spherical food particles of varying sizes, said food particles having jagged edges for clinging to said fibres of said fibrous material
   whereby normative behavioral activities of the animal, including foraging, are increased.

5. An animal cage including apparatus for reducing stress as recited in claim 4, wherein said foraging apparatus is mounted on an upstanding wall.

6. An animal cage including apparatus for reducing stress as recited in claim 4, wherein said foraging apparatus is mounted on a bottom portion of the cage.

7. In a cage for an animal, said cage having at least one upstanding wall, apparatus for reducing stress in a caged animal and for improving the psychological well-being thereof by encouraging normative behavioral activities, comprising:

a foraging apparatus, said foraging apparatus including a stiff material to form a base of said apparatus, and a layer of soft material attached to said base capable of retaining food particles therein wherein said soft material comprises a plastic material having a plurality of blade or hair-like structures simulating grass blades, hair, or fur and further comprising a plurality of food particles of varying sizes for distribution among said blade structures of said material thereby to simulate placement of food particles in a natural habitat of the animal whereby normative behavioral activities of the animal, including foraging, are increased.

8. An animal cage including apparatus for reducing stress as recited in claim 7 wherein aid soft material comprises a plastic material having a plurality of blade structures simulating grass blades, further comprising a plurality of food particles of varying sizes for distribution among said blade structures of said material thereby to simulate placement of food particles in a natural habitat of the animal.

* * * * *